United States Patent
Koyama

(10) Patent No.: US 12,331,209 B2
(45) Date of Patent: Jun. 17, 2025

(54) INKJET INK SET, INKJET RECORDING APPARATUS, AND INKJET RECORDING METHOD

(71) Applicant: KYOCERA Document Solutions Inc., Osaka (JP)

(72) Inventor: Akinori Koyama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 170 days.

(21) Appl. No.: 18/173,674

(22) Filed: Feb. 23, 2023

(65) Prior Publication Data

US 2024/0287340 A1 Aug. 29, 2024

(51) Int. Cl.
| | | |
|---|---|---|
| B41J 2/21 | (2006.01) | |
| C09D 11/322 | (2014.01) | |
| C09D 11/38 | (2014.01) | |
| C09D 11/40 | (2014.01) | |

(52) U.S. Cl.
CPC ............ *C09D 11/40* (2013.01); *B41J 2/2114* (2013.01); *B41J 2/2117* (2013.01); *C09D 11/322* (2013.01); *C09D 11/38* (2013.01)

(58) Field of Classification Search
CPC .................................................. C09D 11/40
See application file for complete search history.

(56) References Cited

U.S. PATENT DOCUMENTS

| | | | |
|---|---|---|---|
| 11,124,666 B2 | 9/2021 | Okuda et al. | |
| 2005/0168550 A1* | 8/2005 | Deckers | B41J 2/2107 |
| | | | 347/100 |
| 2017/0158896 A1* | 6/2017 | Double | C09D 11/324 |
| 2019/0134989 A1* | 5/2019 | Matsumoto | C09D 11/322 |
| 2019/0292392 A1 | 9/2019 | Okuda et al. | |
| 2023/0159772 A1* | 5/2023 | Yamashita | C09D 11/037 |
| | | | 523/205 |

FOREIGN PATENT DOCUMENTS

JP 2019-167518 A 10/2019

* cited by examiner

*Primary Examiner* — Shelby L Fidler
(74) *Attorney, Agent, or Firm* — Studebaker Brackett PLLC

(57) ABSTRACT

An inkjet ink set includes a white ink and a nonwhite ink. The white ink contains a white pigment, a first polysaccharide, glycol ether, and water. The nonwhite ink contains a nonwhite pigment, a second polysaccharide, and water. The white ink has a first surface tension of no greater than 30 mN/m. The first surface tension Tw of the white ink and a second surface tension Tc of the nonwhite ink satisfy formula (1) "3 mN/m≤Tc−Tw≤10 mN/m". The white ink has a first viscosity of no greater than 5.0 mPa·s. The first viscosity Vw of the white ink and a second viscosity Vc of the nonwhite ink satisfy formula (2) "2.0 mPa·s≤Vc−Vw≤6.0 mPa·s".

8 Claims, 1 Drawing Sheet

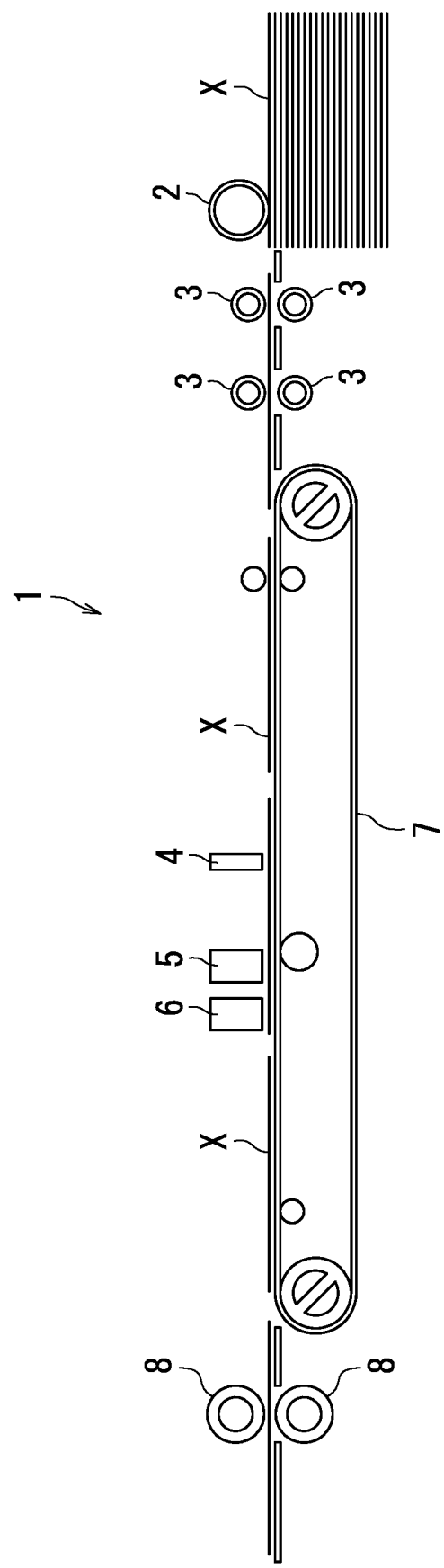

INKJET INK SET, INKJET RECORDING APPARATUS, AND INKJET RECORDING METHOD

BACKGROUND

The present disclosure relates to an inkjet ink set, an inkjet recording apparatus, and an inkjet recording method.

Low-absorbent recording mediums with low water absorption and non-absorbent recording mediums that do not absorb water may be used in label printing and package printing. Various inks are studied for image formation on the low-absorbent recording mediums and the non-absorbent recording mediums. For example, a water-based inkjet ink composition is known that includes a first ink composition and a second ink composition. The first ink composition has a solid content higher than that of the second ink composition by 5% by mass or more. The second ink composition contains an organic solvent with a percentage content higher than that of the first ink composition by 7% by mass or more.

SUMMARY

An inkjet ink set according to an aspect of the present disclosure includes a white ink and a nonwhite ink. The white ink contains a white pigment, a first polysaccharide, glycol ether, and water. The nonwhite ink contains a nonwhite pigment, a second polysaccharide, and water. The white ink has a first surface tension of no greater than 30 mN/m. The first surface tension of the white ink and a second surface tension of the nonwhite ink satisfy formula (1). The white ink has a first viscosity of no greater than 5.0 mPa·s. The first viscosity of the white ink and a second viscosity of the nonwhite ink satisfy formula (2).

$$3 \text{ mN/m} \leq Tc - Tw \leq 10 \text{ mN/m} \tag{1}$$

$$2.0 \text{ mPa·s} \leq Vc - Vw \leq 6.0 \text{ mPa·s} \tag{2}$$

In the formula (1), Tw represents the first surface tension of the white ink and Tc represents the second surface tension of the nonwhite ink. In the formula (2), Vw represents the first viscosity of the white ink and Vc represents the second viscosity of the nonwhite ink.

An inkjet recording apparatus according to an aspect of the present disclosure includes a first recording head that ejects a white ink toward a recording medium, and a second recording head that ejects a nonwhite ink toward at least a part of an area of the recording medium, the area being an area thereof where the white ink has been ejected. The white ink contains a white pigment, a first polysaccharide, glycol ether, and water. The nonwhite ink contains a nonwhite pigment, a second polysaccharide, and water. The white ink has a first surface tension of no greater than 30 mN/m. The first surface tension of the white ink and a second surface tension of the nonwhite ink satisfy formula (1). The white ink has a first viscosity of no greater than 5.0 mPa·s. The first viscosity of the white ink and a second viscosity of the nonwhite ink satisfy formula (2):

$$3 \text{ mN/m} \leq Tc - Tw \leq 10 \text{ mN/m} \tag{1}$$

$$2.0 \text{ mPa·s} \leq Vc - Vw \leq 6.0 \text{ mPa·s} \tag{2}$$

In the formula (1), Tw represents the first surface tension of the white ink and Tc represents the second surface tension of the nonwhite ink. In the formula (2), Vw represents the first viscosity of the white ink and Vc represents the second viscosity of the nonwhite ink.

An inkjet recording method according to an aspect of the present disclosure includes: ejecting a white ink toward a recording medium; and ejecting a nonwhite ink toward at least a part of an area of the recording medium, the area being an area thereof where the white ink has been ejected. The white ink contains a white pigment, a first polysaccharide, glycol ether, and water. The nonwhite ink contains a nonwhite pigment, a second polysaccharide, and water. The white ink has a first surface tension of no greater than 30 mN/m. The first surface tension of the white ink and a second surface tension of the nonwhite ink satisfy formula (1). The white ink has a first viscosity of no greater than 5.0 mPa·s. The first viscosity of the white ink and a second viscosity of the nonwhite ink satisfy formula (2):

$$3 \text{ mN/m} \leq Tc - Tw \leq 10 \text{ mN/m} \tag{1}$$

$$2.0 \text{ mPa·s} \leq Vc - Vw \leq 6.0 \text{ mPa·s} \tag{2}$$

In the formula (1), Tw represents the first surface tension of the white ink and Tc represents the second surface tension of the nonwhite ink. In the formula (2), Vw represents the first viscosity of the white ink and Vc represents the second viscosity of the nonwhite ink.

BRIEF DESCRIPTION OF THE DRAWINGS

FIGURE illustrates an example of an inkjet recording apparatus according to a second embodiment of the present disclosure.

DETAILED DESCRIPTION

The terms used in the present specification will be explained first. In the following, the term "(meth)acryl" is used as a generic term for both acryl and methacryl. The term mass average molecular weight means a mass average molecular weight in terms of polystyrene as measured by gel permeation chromatography unless otherwise stated. The term surface tension means a value as measured using a surface tensiometer in an environment at 25° C.; based on the Wilhelmy plate method unless otherwise stated. The term viscosity means a value as measured using a vibration type viscometer in an environment at 25° C.; unless otherwise stated. Each component described in the present specification may be used independently or in combination of two or more types thereof. The terms used in the present specification have been explained so far.

First Embodiment: Inkjet Ink Set

An inkjet ink set (also referred to below as ink set) according to a first embodiment of the present disclosure includes a white ink and a nonwhite ink.

The white ink contains a white pigment, a first polysaccharide, glycol ether, and water. The white ink may further contain a binder resin, a water-soluble organic solvent that is not glycol ether, and a first surfactant as necessary.

The nonwhite ink contains a nonwhite pigment, a second polysaccharide, and water. The nonwhite ink may further contain a binder resin, glycol ether, a water-soluble organic solvent that is not glycol ether, and a second surfactant as necessary.

In the following, the "water-soluble organic solvent that is not glycol ether" may be referred to as "different water-soluble organic solvent". Also, the "first polysaccharide", the "glycol ether", the "water", the "binder resin", the "different water-soluble organic solvent", and the "first surfactant" contained in the white ink may be respectively referred to as "polysaccharide W", "glycol ether W", "water W", "binder resin W", "different water-soluble organic solvent W", and "surfactant W". Furthermore, the "second polysaccharide", the "water", the "binder resin", the "glycol ether", the "different water-soluble organic solvent", and the "second surfactant" contained in the nonwhite ink may be respectively referred to as "polysaccharide C", "water C", "binder resin C", "glycol ether C", "different water-soluble organic solvent C", and "surfactant C".

Note that where there is no need to distinguish, the "white ink" and the "nonwhite ink" may be generally referred to as "inks", and the "white pigment" and the "nonwhite pigment" may be generally referred to as "pigments". Also, where there is no need to distinguish: the "polysaccharide W" and the "polysaccharide C" may be generally referred to as polysaccharides; the "water W" and the "water C" may be generally referred to as "water"; the "binder resin W" and the "binder resin C" may be generally referred to as "binder resins"; the "glycol ether W" and the "glycol ether C" may be generally referred to as "glycol ethers"; the "different water-soluble organic solvent W" and the "different water-soluble organic solvent C" may be generally referred to as "different water-soluble organic solvents"; and the "surfactant W" and the "surfactant C" may be generally referred to as "surfactants".

In image formation on a low-absorbent recording medium or a non-absorbent recording medium, rather than a high-absorbent recording medium with high water absorption such as paper, with the ink set of the first embodiment, occurrence of unevenness can be inhibited in formed images. In the following, the "low-absorbent recording medium and the non-absorbent recording medium" may be generally referred to as "specific recording mediums". The ink set of the first embodiment can be used in the following manner, for example. The white ink and the nonwhite ink are accommodated in different containers, for example. First, a white solid image (underlying image) is formed on the specific recording medium with the white ink included in the ink set. Next, a nonwhite image is formed on the underlying image with the nonwhite ink included in the ink set.

As described previously, the white ink contains the glycol ether W in the first embodiment. The white ink used for underlying image formation needs to wet and spread over the specific recording medium. As a result of the white ink containing the glycol ether W which is highly hydrophobic, the white ink favorably wets and spreads over the specific recording medium with low or no water absorption.

As described previously, the white ink contains the polysaccharide W in the first embodiment. Although the white ink used for underlying image formation needs to wet and spread over the specific recording medium, excessive wetting and spreading of the white ink may cause unevenness in the underlying image. In order to inhibit occurrence of unevenness in the underlying image, it is necessary for the white ink to evenly and moderately wet and spread on the specific recording medium. When the white ink contains the polysaccharide W, the white ink having landed on the specific recording medium moderately thickens. As a result, the white ink evenly and moderately wets and spreads on the specific recording medium without excessive wetting and spreading.

The white ink has a first surface tension of no greater than 30 mN/m. In the following, the "first surface tension of the white ink" may be referred to as "surface tension Tw" and a later-described "second surface tension of the nonwhite ink" may be referred to as "surface tension Tc". As a result of the surface tension Tw being set to no greater than 30 mN/m, the white ink can evenly and moderately wet and spread on the specific recording medium. Accordingly, occurrence of unevenness can be inhibited in a white image (underlying image) formed on the specific recording medium. The lower limit of the surface tension Tw is not limited particularly and may be at least 20 mN/m, for example.

The surface tension Tw and the surface tension Tc satisfy formula (1). In formula (1), Tw represents the surface tension Tw and Tc represents the surface tension Tc. In the following, a value calculated using a formula "Tc−Tw" may be referred to as "Tc−Tw value".

$$3 \text{ mN/m} \leq Tc-Tw \leq 10 \text{ mN/m} \tag{1}$$

When the Tc−Tw value is less than 3 mN/m, the white ink forming the underlying image and the nonwhite ink ejected on the underlying image may be mixed with each other to cause unevenness in the formed nonwhite image. When the Tc−Tw value is greater than 10 mN/m by contrast, the nonwhite ink hardly wets and spreads on the underlying image, which may lead to occurrence of unevenness in the formed nonwhite image. The Tc−Tw value is at least 3 mN/m and no greater than 10 mN/m in the first embodiment. That is, the surface tension Tc of the nonwhite ink is greater than the surface tension Tw of the white ink by at least 3 mN/m and no greater than 10 mN/m. Accordingly, the nonwhite ink can moderately wet and spread without mixing with the white ink forming the underlying image with a result that occurrence of unevenness can be inhibited in the formed nonwhite image.

The amount of the surfactant W is preferably at least 0.80 parts by mass and no greater than 1.00 part by mass relative to 100.00 parts by mass of the white ink. The amount of the surfactant C is preferably at least 0.30 parts by mass and no greater than 0.65 parts by mass relative to 100.00 parts by mass of the nonwhite ink. Setting the amount of the surfactant W within the above range makes it easy to adjust the surface tension Tw within a specific range. Furthermore, setting the amount of the surfactant W within the above range and setting the amount of the surfactant C within the above range make it easy to adjust the surface tension Tw and the surface tension Tc so as to satisfy formula (1).

(Viscosity)

The white ink has a first viscosity of no greater than 5.0 mPa·s. In the following, the "first viscosity of the white ink" may be referred to as "viscosity Vw" and a later-described "second viscosity of the nonwhite ink" may be referred to as "viscosity Vc". As a result of the viscosity Vw being set to no greater than 5.0 mPa·s, the white ink can evenly and moderately wet and spread on the specific recording medium. Accordingly, occurrence of unevenness can be inhibited in the white image (underlying image) formed on the specific recording medium. The lower limit of the viscosity Vw is not limited particularly and may be at least 2.0 mPa·s, for example.

The viscosity Vw and the viscosity Vc satisfy formula (2). In formula (2), Vw represents the viscosity Vw and Vc represents the viscosity Vc. In the following, a value calculated using the formula "Vc−Vw" may be referred to as "Vc−Vw value".

$$2.0 \text{ mPa·s} \leq Vc-Vw \leq 6.0 \text{ mPa·s} \tag{2}$$

When the Vc−Vw value is less than 2.0 mPa·s, the white ink forming the underlying image and the nonwhite ink ejected on the underlying image may be mixed with each other to cause unevenness in the formed nonwhite image.

When the Vc−Vw value is greater than 6.0 mPa·s by contrast, the nonwhite ink hardly wets and spreads on the underlying image, which may lead to occurrence of unevenness in the formed nonwhite image. In the first embodiment, the Vc−Vw value is at least 2.0 mPa·s and no greater than 6.0 mPa·s. That is, the viscosity Vc of the nonwhite ink is greater than the viscosity Vw of the white ink by at least 2.0 mPa·s and no greater than 6.0 mPa·s. Accordingly, the nonwhite ink can moderately wet and spread without mixing with the white ink forming the underlying image with a result that occurrence of unevenness can be inhibited in the formed nonwhite image. The Vc−Vw value is preferably at least 2.5 mPa·s, and more preferably at least 3.0 mPa·s.

The amount of the polysaccharide W is preferably at least 0.01 parts by mass and no greater than 0.03 parts by mass relative to 100.00 parts by mass of the white ink. By contrast, the amount of the polysaccharide C is preferably at least 0.05 parts by mass and no greater than 0.13 parts by mass relative to 100.00 parts by mass of the nonwhite ink. Setting the amount of the polysaccharide W within the above range makes it easy to adjust the viscosity Vw within a specific range. Furthermore, setting the amount of the polysaccharide W within the above range and setting the amount of the polysaccharide C within the above range make it easy to adjust the viscosity Vw and the viscosity Vc so as to satisfy formula (2).

Components contained in the white ink and the nonwhite ink will be described next.

(Polysaccharides)

As a result of the inks each containing a polysaccharide, the viscosity of the inks having landed on the specific recording medium moderately increases and it is easy to adjust the viscosity Vw and the Vc−Vw value within the respective specific ranges.

The polysaccharide W and the polysaccharide C each are preferably a cellulose derivative or a salt thereof. Examples of the cellulose derivative and the salt thereof include sodium salt of carboxymethyl cellulose (also referred to below as sodium carboxymethylcellulose), calcium salt of carboxymethyl cellulose, methylcellulose, hydroxypropyl methylcellulose, hydroxypropyl cellulose, ethylcellulose, and methylethylcellulose.

In terms of easy adjustment of the viscosity Vw and the Vc−Vw value within the respective specific ranges, the polysaccharide W and the polysaccharide C are preferably sodium carboxymethylcellulose, methylcellulose, or hydroxypropyl methylcellulose, and more preferably sodium carboxymethylcellulose. Note that the polysaccharide W and the polysaccharide C may be the same as or different from each other.

Carboxymethyl cellulose has a structure in which a carboxymethyl group is ether-bonded to a hydroxyl group in an anhydroglucose unit of cellulose (in other words, a structure in which a hydrogen atom of a hydroxyl group in an anhydroglucose unit is substituted with a carboxymethyl group). In terms of easy adjustment of the viscosity Vw and the Vc−Vw value within the respective specific ranges, the degree of etherification of sodium carboxymethylcellulose is preferably at least 0.6 and no greater than 1.5, and more preferably at least 0.8 and less than 1.0 or at least 1.0 and no greater than 1.5. In the present specification, the degree of etherification of sodium carboxymethylcellulose means an average value of the numbers of moles of the carboxymethyl group per 1 mol of the anhydroglucose unit.

Sodium carboxymethylcellulose may be commercially available sodium carboxymethylcellulose. Examples of sodium carboxymethylcellulose with a degree of esterification of at least 0.6 and no greater than 1.5 include CMC DAICEL (registered Japanese trademark)$_{1120}$, CMC DAICEL 1130, CMC DAICEL 1140, CMC DAICEL 1150, CMC DAICEL 1220, CMC DAICEL 1240, CMC DAICEL 1250, CMC DAICEL 1260, CMC DAICEL 1330, and CMC DAICEL 1350 produced by Daicel Miraizu Ltd.

Preferably, a 1%-by-mass aqueous solution of sodium carboxymethylcellulose at 25° C. has a viscosity of at least 10 mPa·s and no greater than 300 mPa·s. As a result of the viscosity of the 1%-by-mass aqueous solution of sodium carboxymethylcellulose at 25° C. being set within the above range, each viscosity of the inks can be easily adjusted within a range suitable for inkjet recording. The viscosity of the 1%-by-mass aqueous solution of sodium carboxymethylcellulose can be measured using a vibration type viscometer (product of Sekonic cooperation, tradename: VM-10A-L), for example.

(Glycol Ethers)

The white ink essentially contains the glycol ether W. The nonwhite ink may contain the glycol ether C as necessary. Glycol ether is relatively highly hydrophobic. As a result of the inks containing glycol ether which is highly hydrophobic, the inks readily wet and spread over the specific recording medium with low or no water absorption. As a result, occurrence of unevenness can be inhibited in a formed image in image formation on the specific recording medium.

In order to inhibit occurrence of unevenness in the formed image, the glycol ether W is preferably at least one (e.g., one) selected from the group consisting of propylene glycol monomethyl ether, propylene glycol monopropyl ether, dipropylene glycol monomethyl ether, dipropylene glycol monopropyl ether, and triethylene glycol monobutyl ether.

In order to inhibit occurrence of unevenness in the formed image, the glycol ether C is preferably dipropylene glycol monomethyl ether.

From the viewpoint of increasing wettability of the inks to the specific recording medium and inhibition of occurrence of unevenness in an image formed on the specific recording medium, the amount of each glycol ether is preferably at least 6 parts by mass and no greater than 24 parts by mass relative to 100 parts by mass of the corresponding ink, and more preferably at least 10 parts by mass and no greater than 24 parts by mass.

From the viewpoint of favorable drying of the inks landed on the specific recording medium, the percentage content of each glycol ether is preferably at least 20% by mass and no greater than 80% by mass to the total mass of the glycol ether and the corresponding different water-soluble organic solvent, more preferably at least 30% by mass and no greater than 80% by mass, and further preferably at least 60% by mass and no greater than 70% by mass.

(Different Water-Soluble Organic Solvents)

Examples of the different water-soluble organic solvents include 1,2-propanediol (i.e., propylene glycol), 3-methyl-1,3-butanediol, 1,2-pentanediol, 2-methyl-1,3-propanediol, 1,3-propanediol, dipropylene glycol, 1,5-pentanediol, 3-methyl-1,5-pentanediol, ethylene glycol, 2-pyrrolidone, and glycerin.

The different water-soluble organic solvents are preferably alkane polyol, more preferably alkanediol, further preferably alkanediol having a carbon number of at least 2 and no greater than 6, and particularly preferably propylene glycol.

From the viewpoint of favorable drying of the inks landed on the specific recording medium, the amount of each different water-soluble organic solvent is preferably at least 0.1 parts by mass and no greater than 20 parts by mass relative to 100 parts by mass of the corresponding ink, and more preferably at least 1 part by mass and no greater than 10 parts by mass. Note that the amount of an organic solvent (water-soluble organic solvent) contained in the nonwhite ink may be the same as, greater than, or smaller than the amount of an organic solvent (water-soluble organic solvent) contained in the white ink.

(Water)

The water contained in each ink is preferably ion exchange water (deionized water). From the viewpoint of favorable drying of the inks landed on the specific recording medium, the percentage content of the water in each ink is preferably at least 40% by mass and no greater than 80% by mass to the mass of the ink.

(White Pigment and Nonwhite Pigment)

Examples of the white pigment include C.I. Pigment White 4, C.I. Pigment White 5, C.I. Pigment White 6, C.I. Pigment White 6:1, C.I. Pigment White 7, C.I. Pigment White 18, C.I. Pigment White 19, C.I. Pigment White 20, C.I. Pigment White 21, C.I. Pigment White 23, C.I. Pigment White 24, C.I. Pigment White 25, C.I. Pigment White 26, C.I. Pigment White 27, and C.I. Pigment White 28. Alternatively, titanium oxide may be used as the white pigment.

From the viewpoint of favorable ejection of the white ink from a recording head, the percentage content of the white pigment is preferably at least 0.1% by mass and no greater than 30% by mass to the mass of the white ink, and more preferably at least 10% by mass and no greater than 20% by mass.

No particular limitations are placed on the nonwhite pigment, and examples of the nonwhite pigment include black pigments, cyan pigments, magenta pigments, yellow pigments, and pigments (also referred to below as other pigments) other than these.

Examples of the black pigments include carbon black produced by the furnace method or the channel method. Examples of commercially available carbon black include RAVEN (registered Japanese trademark) 5000 ULTRA II, RAVEN 3500, RAVEN 2000, RAVEN 1255, RAVEN 1250, RAVEN 1200, RAVEN 1190 ULTRA, RAVEN 1170, RAVEN 1080 ULTRA, and RAVEN 1060 ULTRA produced by Aditya Birla Chemicals LTD. Other examples of the commercially available carbon black include MONARCH (registered Japanese trademark) 1300, MONARCH 1000, MONARCH 800, MONARCH 700, MOGUL (registered Japanese trademark) L, REGAL (registered Japanese trademark) 400R, REGAL 660R, and REGAL 330R produced by Cabot Corporation. Other examples of the commercially available carbon black include MITSUBISHI (registered Japanese trademark) CARBON BLACK #2300, MITSUBISHI CARBON BLACK #980, MITSUBISHI CARBON BLACK #970, MITSUBISHI CARBON BLACK #960, MITSUBISHI CARBON BLACK #950, MITSUBISHI CARBON BLACK #900, MITSUBISHI CARBON BLACK #850, MITSUBISHI CARBON BLACK MCF88, MITSUBISHI CARBON BLACK MA600, MITSUBISHI CARBON BLACK #52, MITSUBISHI CARBON BLACK #47, MITSUBISHI CARBON BLACK #45, MITSUBISHI CARBON BLACK #40, MITSUBISHI CARBON BLACK #33, MITSUBISHI CARBON BLACK #25, MITSUBISHI CARBON BLACK MA7, MITSUBISHI CARBON BLACK MA8, and MITSUBISHI CARBON BLACK MA100 produced by Mitsubishi Chemical Corporation. Still other examples of the commercially available carbon black include COLOUR BLACK FW 1, COLOUR BLACK FW 2, COLOUR BLACK FW 200, COLOUR BLACK FW 18, SPECIAL BLACK 6, COLOUR BLACK S 160, SPECIAL BLACK 5, PRINTEX (registered Japanese trademark) U, PRINTEX V, SPECIAL BLACK 4, SPECIAL BLACK 4A, PRINTEX 140 U, PRINTEX 140 V, and PRINTEX 35 produced by Orion Engineered Carbons KK.

Examples of the cyan pigments include C.I. Pigment Blue 1, C.I. Pigment Blue 2, C.I. Pigment Blue 3, C.I. Pigment Blue 15:3, C.I. Pigment Blue 15:4, C.I. Pigment Blue 16, C.I. Pigment Blue 22, C.I. Vat Blue 4, and C.I. Vat Blue 6.

Examples of the magenta pigments include C.I. Pigment Red 5, C.I. Pigment Red 7, C.I. Pigment Red 12, C.I. Pigment Red 48(Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 184, C.I. Pigment Red 202, and C.I. Pigment Violet 19.

Examples of the yellow pigments include C.I. Pigment Yellow 12, C.I. Pigment Yellow 13, C.I. Pigment Yellow 14, C.I. Pigment Yellow 17, C.I. Pigment Yellow 74, C.I. Pigment Yellow 83, C.I. Pigment Yellow 93, C.I. Pigment Yellow 94, C.I. Pigment Yellow 95, C.I. Pigment Yellow 120, C.I. Pigment Yellow 128, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185.

Examples of the other pigments include C.I. Pigment Green 7, C.I. Pigment Green 10, C.I. Pigment Green 36, C.I. Pigment Brown 3, C.I. Pigment Brown 5, C.I. Pigment Brown 25, C.I. Pigment Brown 26, C.I. Pigment Orange 2, C.I. Pigment Orange 5, C.I. Pigment Orange 7, C.I. Pigment Orange 13, C.I. Pigment Orange 14, C.I. Pigment Orange 15, C.I. Pigment Orange 16, C.I. Pigment Orange 24, C.I. Pigment Orange 34, C.I. Pigment Orange 36, C.I. Pigment Orange 38, C.I. Pigment Orange 40, C.I. Pigment Orange 43, C.I. Pigment Orange 62, C.I. Pigment Orange 63, C.I. Pigment Orange 64, and C.I. Pigment Orange 71.

From the viewpoint of favorable ejection of the nonwhite ink from a recording head, the percentage content of the nonwhite pigment is preferably at least 0.1% by mass and no greater than 15% by mass to the mass of the nonwhite ink, and more preferably at least 0.5% by mass and no greater than 5% by mass.

Each pigment is favorably used in a state of being dispersed in a dispersion medium (e.g., water). A method for dispersing the pigment is not limited particularly and may be a method in which the pigment is dispersed in the dispersion medium using a dispersant or a method in which the pigment is dispersed in the dispersion medium without using a dispersant, for example. The pigments may each be a pigment (non-self-dispersion type pigment) dispersed in the dispersion medium by a dispersant or a pigment (self-dispersion type pigment) dispersed in the dispersion medium without a dispersant. Examples of the dispersant include a surfactant and a polymer dispersant (also referred to below as "pigment dispersion resin"). Note that the surfactant will be descried later.

The pigment dispersion resin attaches to the surfaces of pigment particles to disperse the pigment particles in each ink. Note that a portion of the pigment dispersion resin may be free in the ink without attaching to the surfaces of the pigment particles. Examples of the pigment dispersion resin include acrylic resin, styrene-(meth)acrylic resin, styrene-maleic acid resin, and urethane resin. From the viewpoint of stable dispersion of the pigment, the pigment dispersion resin is preferably (meth)acrylic resin or styrene-(meth) acrylic resin.

The pigment dispersion resin has a mass average molecular weight of preferably at least 5000 and no greater than 100,000, more preferably at least 10,000 and no greater than 50,000, and further preferably at least 15,000 and no greater than 30,000. As a result of the mass average molecular weight of the pigment dispersion resin being set to at least 5000, the inks can have increased dispersion stability. As a result of the mass average molecular weight of the pigment dispersion resin being set to no greater than 100,000, the inks can be favorably ejected from the recording heads.

The ratio of the mass of the pigment dispersion resin to the mass of the corresponding pigment is preferably at least 0.02 and no greater than 0.45, more preferably at least 0.04 and no greater than 0.40, and further preferably at least 0.05 and no greater than 0.35. As a result of the ratio of the mass of the pigment dispersion resin to the mass of the corresponding pigment being set to no greater than 0.45, viscosities of the pigment dispersions and the inks can be easily adjusted to respective desired values. As a result of the ratio of the mass of the pigment dispersion resin to the mass of the corresponding pigment being set to at least 0.02, the inks can have increased dispersion stability.

The pigment dispersion resin may be a commercially available pigment dispersion resin. Examples of the commercially available pigment dispersion resin include JON-CRYL (registered Japanese trademark) 586 and JONCRYL 611 produced by BASF Japan Ltd.; DISPERBYK (registered Japanese trademark)-190 and DISPERBYK-191 produced by BYK Chemie Japan, K.K.; and SOLSPERSE 20000 and SOLSPERSE 27000 produced by Lubrizol Japan Limited.

(Binder Resins)

Each ink preferably contains a binder resin. The binder resin binds the pigment in the ink to the recording medium once the ink lands on the recording medium. As a result of each ink containing a binder resin, the pigments are favorably bound to a recording medium for example by heating, thereby achieving formation of images with favorable scratch resistance. As a result of each ink containing a binder resin, the pigments are favorably bound to the recording medium to inhibit occurrence of unevenness in the formed images.

The binder resin is a water-insoluble resin, for example. No particular limitations are placed on the binder resin and examples of the binder resin include urethane resin, (meth)acrylic resin, styrene-(meth)acrylic resin, (meth)acryl-urethane resin, polyester resin, and modified polyolefin resin.

The white ink and the nonwhite ink each preferably contain a water-insoluble resin as the binder resin, and more preferably contain urethane resin, (meth)acrylic resin, or styrene-(meth)acrylic resin, and further preferably contain urethane resin (e.g., polyisocyanate).

The water-insoluble resin is preferably used in the state of resin emulsion. In a case in which the water-insoluble resin is used in the stated of resin emulsion, the inks contain emulsified particles constituted by the water-insoluble resin. The resin emulsion may be a commercially available resin emulsion.

The urethane resin is not limited particularly so long as it has a urethane bond in its molecule. Examples of commercially available urethane resin emulsions include: SUPERFLEX (registered Japanese trademark) 170, SUPERFLEX 210, SUPERFLEX 820, and SUPERFLEX 870 produced by DKS Co. Ltd.; and TAKELAC (registered Japanese trademark) W-6010 and TAKELAC W-6020 produced by Mitsui Chemicals, Inc.

Examples of commercially available (meth)acrylic resin emulsions include: MOWINYL (registered Japanese trademark) 6718, MOWINYL 6751D, MOWINYL 6750, MOWINYL 6760, MOWINYL 6770, MOWINYL 6800, MOWINYL 6969D, MOWINYL 6899D, and MOWINYL 6820 produced by Japan Coating Resin Corporation.

Examples of commercially available styrene-(meth)acrylic resins emulsion include: MOWINYL 6960, MOWINYL 6963, and MOWINYL RS-009C22 produced by Japan Coating Resin Corporation; and QE-1042 produced by SEIKO PMC CORPORATION.

From the viewpoint of favorable ejection of the inks in ejection from the recording heads, the percentage content of the binder resin is preferably at least 1% by mass and no greater than 10% by mass to the mass of each ink.

(Surfactants)

Examples of the surfactants include an acetylene surfactant, an acrylic surfactant, a silicone surfactant, and a fluoric surfactant. The surfactants may each be a commercially available surfactant.

In the present specification, the acetylene surfactant means a surfactant having an acetylene bond (carbon-atom triple bond) in its molecule. Examples of commercially available acetylene surfactants include SURFYNOL (registered Japanese trademark) 420, SURFYNOL 440, OLFINE (registered Japanese trademark) E1010, OLFINE EXP. 4200, and OLFINE EXP. 4300 produced by Nissin Chemical Industry Co., Ltd.

The acrylic surfactant in the present specification means a surfactant of a polymer of (meth)acrylic acid or derivative thereof. Examples of commercially available acrylic surfactants include: BYK (registered Japanese trademark)-380 N and BYK-381 produced by BYK Chemie Japan, K.K.; and POLYFLOW KL-850 produced by Kyoeisha Chemical Co., Ltd.

In the present specification, the silicone surfactant means a surfactant having a siloxane bond in its molecule. Examples of commercially available silicone surfactants include SILFACE (registered Japanese trademark) SAGO02 and SILFACE SAG503A produced by Nissin Chemical Industry Co., Ltd.

In the present specification, the fluoric surfactant means a surfactant having a fluoro group in its molecule. Examples of commercially available fluoric surfactants include CAPSTONE FS-30, CAPSTONE FS-31, CAPSTONE FS-65, and CAPSTONE FS-3100 produced by Chemours.

From the viewpoint of favorable ejection of the inks from the recording heads, the surfactants each are preferably an acetylene surfactant or an acrylic surfactant.

In terms of easy adjustment of the surface tension Tw and the Tc−Tw value within the respective specific ranges, the HLB value of the surfactant W and the HLB value of the surfactant C each are preferably at least 2 and no greater than 6, more preferably at least 3 and no greater than 5, and further preferably 4. The HLB value of the surfactant W may be the same as or different from the HLB value of the surfactant C.

(Other Components)

The white ink and the nonwhite ink may each contain any other components as necessary. Examples of the other components include a pH adjuster, a chelating agent, a preservative, and an antifungal agent. The percentage contents of the other components are not limited particularly and may be set as appropriate according to necessity.

(White Ink Production Method and Nonwhite Ink Production Method)

A white ink production method and a nonwhite ink production method each include preparing a pigment dispersion and mixing, for example.

In the preparing a pigment dispersion in the white ink production method, the white pigment, the water W, and a dispersant as necessary are mixed for example using a disperser. In the preparing a pigment dispersion in the nonwhite ink production method, the nonwhite pigment, the water C, and a dispersant as necessary are mixed for example using a disperser. No particular limitations are placed on the disperser and examples of the disperser include a ball mill and a bead mill. Among them, a bead mill is preferably used. Examples of the bead mill include ATTRITOR (registered Japanese trademark) produced by Nippon Coke & Engineering Co., Ltd., a sand grinder produced by Aimex Co. Ltd., DYNO (registered Japanese trademark) MILL produced by Willy A. Bachofen AG, and ULTRA APEX MILL produced by Hiroshima Metal & Machinery Co., Ltd. Where the resultant pigment dispersion contains coarse particles, the coarse particles are preferably removed by filtration or centrifugation.

In the mixing in the white ink production method, a white pigment dispersion containing the white pigment, the polysaccharide W, the glycol ether W, the water W, and a component added as necessary are mixed to obtain the white ink. In the mixing in the nonwhite ink production method, a nonwhite pigment dispersion containing the nonwhite pigment, the polysaccharide C, the water C, and a component added as necessary are mixed to obtain the nonwhite ink. Where the resultant white ink or nonwhite ink contains coarse particles, the coarse particles are preferably removed by filtration or centrifugation.

Second Embodiment: Inkjet Recording Apparatus

The following describes an inkjet recording apparatus 1, which is an example of an inkjet recording apparatus according to a second embodiment of the present disclosure, with reference to FIGURE. FIGURE illustrates the inkjet recording apparatus 1 according to the second embodiment.

The inkjet recording apparatus 1 of the second embodiment includes a sheet feed roller 2, a plurality of conveyance roller pairs 3, a sensor 4, a first recording head 5, a second recording head 6, a conveyor belt 7, and an ejection roller pair 8.

In the second embodiment, a white ink to be ejected from the first recording head 5 and a nonwhite ink to be ejected from the second recording head 6 are respectively the white ink and the nonwhite ink of the ink set according to the first embodiment. As such, the inkjet recording apparatus 1 of the second embodiment can inhibit occurrence of unevenness in a formed image in image formation on the specific recording medium for the reasons previously described in the first embodiment.

The inkjet recording apparatus 1 accommodates multiple sheets of a recording medium X in a sheet feed cassette (not illustrated). Examples of the recording medium X include the specific recording mediums. Examples of low-absorbent recording mediums with low water absorption among the specific recording mediums include art paper, coated paper, photo printing paper, and cast coated paper. Examples of non-absorbent recording mediums with no water absorption among the specific recording mediums include foil paper, synthetic paper, and plastic substrates. Examples of the plastic substrates include polyester (e.g., polyethylene terephthalate (PET)) substrates, polypropylene substrates, polystyrene substrates, and polyvinyl chloride substrates. One side or both sides of the specific recording mediums may be subjected to surface treatment. Examples of the surface treatment include corona discharge treatment, plasma treatment, and primer treatment.

The sheet feed roller 2 feeds the topmost sheet of the sheets of the recording medium X one at a time by rotation thereof.

The conveyance roller pairs 3 convey the fed sheet of the recording medium X to the conveyor belt 7.

The conveyor belt 7 is an endless belt horizontally wound between a pair of rollers. The sheet of the recording medium X conveyed by the conveyance roller pairs 3 is conveyed to the ejection roller pair 8 by circulation of the conveyor belt 7.

The sensor 4 is disposed above the conveyor belt 7. The sensor 4 is disposed upstream of the first recording head 5 in terms of a conveyance direction of the sheet of the recording medium X. The sensor 4 detects the leading edge of the sheet of the recording medium X conveyed by the conveyor belt 7. With reference to the time when the sensor 4 detects the leading edge of the sheet of the recording medium X, an instruction to eject the white ink is input to the first recording head 5 and an instruction to eject the nonwhite ink is input to the second recording head 6.

The first recording head 5 and the second recording head 6 are disposed above the conveyor belt 7. The first recording head 5 is disposed upstream of the second recording head 6 in terms of a direction of conveyance by the conveyor belt 7 (corresponding to the conveyance direction of the recording medium X). The first recording head 5 and the second recording head 6 each are a long recording head of line scan type with a width that is the same as or larger than the width of the sheet of the recording medium X. The first recording head and the second recording head 6 each include many nozzles in the lower surface (ejection surface) thereof that is opposite to the conveyor belt 7. The first recording head 5 and the second recording head 6 extend in a direction perpendicular to the conveyance direction of the sheet of the recording medium X and are fixed to the inkjet recording apparatus 1. Furthermore, the first recording head 5 and the second recording head 6 are fixed to the inkjet recording apparatus 1 so that the lower surfaces thereof are out of contact with the sheet of the recording medium X placed on the conveyor belt 7.

The first recording head 5 accommodates the white ink included in the ink set of the first embodiment. In the course of the conveyor belt 7 conveying the sheet of the recording medium X, the first recording head 5 (specifically, the many nozzles of the first recording head 5) ejects the white ink toward the sheet of the recording medium X. As a result, a white image (underlying image) is formed on the sheet of the recording medium X. The white ink may be ejected toward the entirety of the recording medium X. However, because an underlying image can be formed with a small amount of the white ink, the white ink is preferably ejected toward a part of the sheet of the recording medium X that is larger than an area of the sheet of the recording medium X where the nonwhite ink is to be ejected or only the area thereof where the nonwhite ink is to be ejected.

The second recording head 6 accommodates the nonwhite ink included in the ink set of the first embodiment. After the white ink is ejected from the first recording head 5, the second recording head 6 (specifically, the many nozzles of the second recording head 6) ejects the nonwhite ink toward the sheet of the recording medium X. Specifically, the second recording head 6 ejects the nonwhite ink toward at least a part (e.g., a part or the entirety) of an area of the sheet of the recording medium X, the area being an area where the white ink has been ejected.

The sheet of the recording medium X toward which the nonwhite ink has been ejected from the second recording head 6 is further conveyed by the conveyor belt 7. Thereafter, the sheet of the recording medium X is delivered to the ejection roller pair 8 at the terminal of the conveyor belt 7 and then discharged from the conveyor belt 7.

The ejection roller pair 8 ejects the sheet of the recording medium X out of the inkjet recording apparatus 1. In the manner described above, an underlying image is formed with the white ink on the sheet of the recording medium X and a nonwhite image is formed with the nonwhite ink on the underlying image.

Note that the white ink and the nonwhite ink do not need to be pre-mixed, and therefore, the inkjet recording apparatus 1 need not include a mixer for mixing the two inks. As such, the apparatus configuration of the inkjet recording apparatus 1 can be simplified.

The inkjet recording apparatus 1, which is an example of the inkjet recording apparatus according to the second embodiment, has been described so far with reference to FIGURE. However, the inkjet recording apparatus of the second embodiment is not limited to the inkjet recording apparatus 1 and can be altered as in the following first to fourth variations.

The first variation is as follows. In the inkjet recording apparatus 1, the recording medium X used is cut into a specific size (e.g., A4 size) as an example. However, a rolled recording medium may be used.

The second variation is as follows. The inkjet recording apparatus 1 includes two recording heads of the first recording head 5 and the second recording head 6 as an example. However, the inkjet recording apparatus of the second embodiment may include three or more recording heads. For example, as a result of a plurality of recording heads for nonwhite ink ejection being provided, multi-color images can be formed.

The third variation is as follows. The inkjet recording apparatus 1 does not include a wiping blade as an example. However, the inkjet recording apparatus of the second embodiment may include wiping blades that wipe the ejection surfaces of the first recording head 5 and the second recording head 6.

The fourth variation is as follows. The inkjet recording apparatus 1 includes the first recording head 5 and the second recording head 6 that are of line scan type. However, the inkjet recording apparatus of the second embodiment may include recording heads of serial scan type that scan the recording medium X.

The inkjet recording apparatus according to the second embodiment has been described so far with reference to FIGURE.

Third Embodiment: Inkjet Recording Method

An inkjet recording method according to a third embodiment of the present disclosure will be described next with further reference to FIGURE. The inkjet recording method of the third embodiment includes ejecting a white ink toward a recording medium X (white ink ejection) and ejecting a nonwhite ink toward at least a part of an area of the recording medium X, the area being an area thereof where the white ink has been ejected (nonwhite ink ejection).

The white ink and the nonwhite ink used in the inkjet recording method of the third embodiment are respectively the white ink and the nonwhite ink included in the ink set according to the first embodiment. As such, the inkjet recording method of the third embodiment can inhibit occurrence of unevenness in a formed image in image formation on the specific recording medium for the reasons previously described in the first embodiment.

The inkjet recording method of the third embodiment is implemented for example by the inkjet recording apparatus 1 according to the second embodiment. In the white ink ejection, the first recording head 5 ejects the white ink toward the recording medium X. In the nonwhite ink ejection, the second recording head 6 ejects the nonwhite ink toward at least a part of an area of the recording medium X, the area being an area thereof where the white ink has been ejected. The inkjet recording method according to the third embodiment has been described so far with reference to FIGURE.

EXAMPLES

The following provides further specific description of the present disclosure through use of Examples. However, the present disclosure is not limited to Examples.

<Preparation of Pigment Dispersion W>

A pigment dispersion W for use in white ink production was prepared by the following method. A pre-dispersion was yielded by mixing 30 parts by mass of a white pigment, 20 parts by mass of a pigment dispersion resin, and 50 parts by mass of ion exchange water using a disperser. The white pigment used was rutile type titanium oxide ("CR-50", product of ISHIHARA SANGYO KAISHA, LTD.). The pigment dispersion resin used was "DISPERBYK-190" produced by BYK Chemie Japan K.K. (solid concentration: 40% by mass, dispersion medium: water). Next, the pre-dispersion was further mixed using a bead mill ("DYNO (registered Japanese trademark) MILL", product of Willy A. Bachofen AG) loaded with zirconia beads with a diameter of 0.3 mm to obtain the pigment dispersion W.

<Preparation of Pigment Dispersion C>

A pigment dispersion C for use in cyan ink production was prepared by the following method. A pre-dispersion was yielded by mixing 15 parts by mass of a cyan pigment, 10 parts by mass of a pigment dispersion resin, and 75 parts by mass of ion exchange water using a disperser. The cyan pigment used was C.I. Pigment Blue 15:3 ("HELIOGEN (registered Japanese trademark) BLUE D 7088", product of BASF Japan Ltd.). The pigment dispersion resin used was "DISPERBYK-190" produced by BYK Chemie Japan K.K. (solid concentration: 40% by mass, dispersion medium: water). Next, the pre-dispersion was further mixed using a bead mill ("DYNO (registered Japanese trademark) MILL", product of Willy A. Bachofen AG) loaded with zirconia beads with a diameter of 0.3 mm to obtain the pigment dispersion C.

<White Ink Production>

Next, white inks (WI-1) to (WI-13) were produced. Compositions of these white inks are shown in Table 1 which will be described later.

(Production of White Ink (WI-1))

Components were mixed using a stirrer so as to achieve the composition shown in the column titled "(WI-1)" for "White ink" in Table 1. Specifically, 50.00 parts by mass of the pigment dispersion W, 8.00 parts by mass of a binder resin, 0.02 parts by mass of sodium carboxymethylcellulose, 10.00 parts by mass of dipropylene glycol monomethyl ether, 5.00 parts by mass of propylene glycol, 0.80 parts by mass of a surfactant, and the remaining amount (26.18 parts by mass) of ion exchange water were mixed to yield a mixed liquid. The binder resin used was "SUPERFLEX (registered Japanese trademark) 210" produced by DKS Co. Ltd. (solid content: polyisocyanate being a water-insoluble resin, solid concentration: 35% by mass, dispersion medium: water). The sodium carboxymethylcellulose used was "CMC DAICEL 1330" produced by Daicel Miraizu Ltd. The surfactant used was "SURFYNOL (registered Japanese trademark) 420" produced by Nissin Chemical Industry Co., Ltd. (active component concentration: 100% by mass, HLB value: 4). Next, the mixed liquid was filtered using a membrane filter with a pore size of 5 μm to obtain a white ink (WI-1).

(Production of White Inks (WI-2) to (WI-13))

The white inks (WI-2) to (WI-13) were produced according to the same method as that for producing the white ink (WI-1) in all aspects other than that components were mixed so as to achieve the compositions shown in the columns titled "(WI-2)" to "(WI-13)" for "White ink" in Table 1.

<Cyan Ink Production>

Next, cyan inks (CI-1) to (CI-6) were produced. Compositions of these cyan inks are shown in Table 2 which will be described later. The cyan inks (CI-1) to (CI-6) were produced according to the same method as that for producing the white ink (WI-1) in all aspects other than that components were mixed so as to achieve the compositions shown in the columns titled "(CI-1)" to "(CI-6)" for "Cyan ink" in Table 2.

<Surface Tension Measurement>

The surface tension of each ink was measured based on the Wilhelmy plate method in an environment at 25° C. using a surface tensiometer ("DY-300", product of Kyowa Interface Science Co., Ltd., automatic surface tensiometer). Measurement results are shown in Tables 1 to 3.

<Viscosity Measurement>

The viscosity of each ink was measured in an environment at 25° C. using a vibration type viscometer ("VM-10A", product of SEKONIC CORPORATION). Measurement results are shown in Tables 1 to 3.

<Evaluation of Inhibition of Occurrence of Unevenness>

In evaluation of inhibition of occurrence of unevenness, an inkjet recording apparatus (prototype produced by KYOCERA Document Solutions Inc.) including a first recording head and a second recording head was used as an evaluation apparatus. Each of the first recording head and the second recording head used was a recording head of line scan type ("KJ4B-1200", product of KYOCERA Corporation). The first recording head was located upstream of the second recording head in terms of a conveyance direction of a recording medium. The distance between the first recording head and the second recording head was 5 cm. With respect to each of the white inks and each of the cyan inks, the white ink was loaded in the first recording head and the cyan ink was loaded in the second recording head. The ejection amount of the white ink from the first recording head and the ejection amount of the cyan ink from the second recording head each were set to 3 pL. The conveyance speed of the recording medium was set to 20 m/min.

The white ink was ejected from the first recording head and the cyan ink was ejected from the second recording head toward one sheet of film ("LUMIRROR (registered Japanese trademark) S10 #50", product of Toray Industries, Inc., PET film) in an environment at a temperature of 23° C.; and a relative humidity of 50% using the aforementioned evaluation apparatus. In the manner described above, a white solid image with a width of 3 cm and a length of 3 cm was printed on the film and a cyan solid image with a width of 3 cm and a length of 3 cm was printed on the printed white solid image. Next, the film with a layered image printed thereon including the white solid image and the cyan solid image on the white solid image was dried at a temperature of 80° C.; for one minute using a dryer to obtain an evaluation film. The layered image printed on the evaluation film was observed with the naked eye, and whether or not unevenness has occurred in the layered image was evaluated according to the following criteria. Note that streak unevenness in the following criteria means unevenness with a streak in parallel to the conveyance direction of the recording medium. Evaluation results are shown in Table 3. An ink set with a rating of A was determined to be acceptable while an ink set with a rating of any of B1 to B3 was determined to be unacceptable.

(Evaluation Criteria for Inhibition of Occurrence of Unevenness)

A: No unevenness occurred in the formed layered image.

B1: Streak unevenness occurred in the white solid image.

B2: Unevenness occurred that was shaded as if the white ink is partially mixed with the cyan solid image.

B3: Streak unevenness occurred in the cyan solid image.

Note that the terms in Tables 1 to 2 mean as follows.

Part: Parts by mass

Binder resin: Emulsion ("SUPERFLEX (registered Japanese trademark) 210", product of DKS Co. Ltd., solid component: polyisocyanate being a water-insoluble resin, solid concentration: 35% by mass, dispersion medium: water) of self-emulsified urethane resin CMC-Na: Sodium carboxymethylcellulose ("CMC DAICEL 1330", product of Daicel Miraizu Ltd., degree of etherification: 1.3)

MC: Methyl cellulose ("METOLOSE (registered Japanese trademark) MCE-100", product of Shin-Etsu Chemical Co., Ltd.)

HPMC: Hydroxypropyl methylcellulose ("METOLOSE NE-100", product of Shin-Etsu Chemical Co., Ltd.)

Surfactant: Acetylene surfactant ("SURFYNOL (registered Japanese trademark) 420", product of Nissin Chemical Industry Co., Ltd., active component concentration: 100% by mass, HLB value: 4)

Water: Ion exchange water

Rest: An amount that makes the total mass of the components in the corresponding ink 100.00 parts by mass For example, the amount of the ion exchange water contained in the ink (WI-1) is 26.18 parts by mass (=100.00−(50.00+8.00+0.02+10.00+5.00+0.80)).

-: No containment of a corresponding component

Furthermore, the terms in Table 3 mean as follows.

Unevenness: Evaluation result of inhibition of occurrence of unevenness

-: A white solid image being formed with only a white ink without using a cyan ink

TABLE 1

| White ink | | WI-1 | WI-2 | WI-3 | WI-4 | WI-5 | WI-6 | WI-7 |
|---|---|---|---|---|---|---|---|---|
| Pigment dispersion W | [part] | 50.00 | 50.00 | 50.00 | 50.00 | 50.00 | 50.00 | 50.00 |
| Binder resin | [part] | 8.00 | 8.00 | 8.00 | 8.00 | 8.00 | 8.00 | 8.00 |
| CMC-Na | [part] | 0.02 | 0.04 | 0.02 | 0.02 | 0.02 | 0.02 | 0.04 |
| MC | [part] | — | — | — | — | — | — | — |
| HPMC | [part] | — | — | — | — | — | — | — |
| Dipropylene glycol monomethyl ether | [part] | 10.00 | 10.00 | — | — | — | — | 10.00 |
| Propylene glycol monomethyl ether | [part] | — | — | 10.00 | — | — | — | — |
| Propylene glycol monopropyl ether | [part] | — | — | — | 10.00 | — | — | — |
| Dipropylene glycol monopropyl ether | [part] | — | — | — | — | 10.00 | — | — |
| Triethylene glycol monobutyl ether | [part] | — | — | — | — | — | 10.00 | — |
| Propylene glycol | [part] | 5.00 | 5.00 | 5.00 | 5.00 | 5.00 | 5.00 | 5.00 |
| Surfactant | [part] | 0.80 | 0.75 | 0.80 | 0.80 | 0.80 | 0.80 | 0.80 |
| Water | [part] | Rest | Rest | Rest | Rest | Rest | Rest | Rest |
| Total | [part] | 100.00 | 100.00 | 100.00 | 100.00 | 100.00 | 100.00 | 100.00 |
| Surface tension | [mN/m] | 30 | 31 | 30 | 30 | 30 | 30 | 30 |
| Viscosity | [mPa·s] | 5.0 | 6.2 | 4.9 | 5.0 | 5.0 | 4.9 | 6.2 |

| White ink | | WI-8 | WI-9 | WI-10 | WI-11 | WI-12 | WI-13 |
|---|---|---|---|---|---|---|---|
| Pigment dispersion W | [part] | 50.00 | 50.00 | 50.00 | 50.00 | 50.00 | 50.00 |
| Binder resin | [part] | 8.00 | 8.00 | 8.00 | 8.00 | 8.00 | 8.00 |
| CMC-Na | [part] | 0.02 | 0.02 | 0.01 | — | — | 0.02 |
| MC | [part] | — | — | — | 0.02 | — | — |
| HPMC | [part] | — | — | — | — | 0.02 | — |
| Dipropylene glycol monomethyl ether | [part] | 10.00 | 10.00 | 10.00 | 10.00 | 10.00 | — |
| Propylene glycol monomethyl ether | [part] | — | — | — | — | — | — |
| Propylene glycol monopropyl ether | [part] | — | — | — | — | — | — |
| Dipropylene glycol monopropyl ether | [part] | — | — | — | — | — | — |
| Triethylene glycol monobutyl ether | [part] | — | — | — | — | — | — |
| Propylene glycol | [part] | 5.00 | 5.00 | 5.00 | 5.00 | 5.00 | 5.00 |
| Surfactant | [part] | 0.75 | 1.20 | 0.80 | 0.80 | 0.80 | 0.80 |
| Water | [part] | Rest | Rest | Rest | Rest | Rest | Rest |
| Total | [part] | 100.00 | 100.00 | 100.00 | 100.00 | 100.00 | 100.00 |
| Surface tension | [mN/m] | 31 | 25 | 30 | 30 | 30 | 32 |
| Viscosity | [mPa·s] | 5.0 | 5.0 | 4.0 | 4.8 | 4.8 | 4.7 |

TABLE 2

| Cyan ink | | CI-1 | CI-2 | CI-3 | CI-4 | CI-5 | CI-6 |
|---|---|---|---|---|---|---|---|
| Pigment dispersion C | [part] | 20.00 | 20.00 | 20.00 | 20.00 | 20.00 | 20.00 |
| Binder resin | [part] | 7.00 | 7.00 | 7.00 | 7.00 | 7.00 | 7.00 |
| CMC-Na | [part] | 0.06 | 0.12 | 0.04 | 0.14 | — | — |
| MC | [part] | — | — | — | — | 0.06 | — |
| HPMC | [part] | — | — | — | — | — | 0.06 |
| Dipropylene glycol monomethyl ether | [part] | 10.00 | 10.00 | 10.00 | 10.00 | 10.00 | 10.00 |
| Propylene glycol | [part] | 5.00 | 5.00 | 5.00 | 5.00 | 5.00 | 5.00 |
| Surfactant | [part] | 0.65 | 0.30 | 0.70 | 0.25 | 0.65 | 0.65 |
| Water | [part] | Rest | Rest | Rest | Rest | Rest | Rest |
| Total | [part] | 100.00 | 100.00 | 100.00 | 100.00 | 100.00 | 100.00 |
| Surface tension | [mN/m] | 33 | 40 | 32 | 41 | 33 | 33 |
| Viscosity | [mPa·s] | 7.1 | 10.0 | 6.2 | 11.1 | 7.0 | 7.0 |

TABLE 3

|  | Ink set | White ink | Surface tension Tw [mN/m] | Viscosity Vw [mPa·s] | Cyan ink | Surface tension Tc [mN/m] | Viscosity Vc [mPa·s] | Tc − Tw [mN/m] | Vc − Vw [mPa·s] | Unevenness |
|---|---|---|---|---|---|---|---|---|---|---|
| Example 1 | A-1 | WI-1 | 30 | 5.0 | CI-1 | 33 | 7.1 | 3 | 2.1 | A |
| Example 2 | A-2 | WI-1 | 30 | 5.0 | CI-2 | 40 | 10.0 | 10 | 5.0 | A |
| Example 3 | A-3 | WI-3 | 30 | 4.9 | CI-1 | 33 | 7.1 | 3 | 2.2 | A |
| Example 4 | A-4 | WI-4 | 30 | 5.0 | CI-1 | 33 | 7.1 | 3 | 2.1 | A |
| Example 5 | A-5 | WI-5 | 30 | 5.0 | CI-1 | 33 | 7.1 | 3 | 2.1 | A |
| Example 6 | A-6 | WI-6 | 30 | 4.9 | CI-1 | 33 | 7.1 | 3 | 2.2 | A |
| Example 7 | A-7 | WI-9 | 25 | 5.0 | CI-1 | 33 | 7.1 | 8 | 2.1 | A |
| Example 8 | A-8 | WI-10 | 30 | 4.0 | CI-1 | 33 | 7.1 | 3 | 3.1 | A |
| Example 9 | A-9 | WI-11 | 30 | 4.8 | CI-1 | 33 | 7.1 | 3 | 2.3 | A |
| Example 10 | A-10 | WI-12 | 30 | 4.8 | CI-1 | 33 | 7.1 | 3 | 2.3 | A |
| Example 11 | A-11 | WI-1 | 30 | 5.0 | CI-5 | 33 | 7.0 | 3 | 2.0 | A |
| Example 12 | A-12 | WI-1 | 30 | 5.0 | CI-6 | 33 | 7.0 | 3 | 2.0 | A |
| Comparative Example 1 | B-1 | WI-2 | 31 | 6.2 | — | — | — | — | — | B1 |
| Comparative Example 2 | B-2 | WI-1 | 30 | 5.0 | CI-3 | 32 | 6.2 | 2 | 1.2 | B2 |
| Comparative Example 3 | B-3 | WI-1 | 30 | 5.0 | CI-4 | 41 | 11.1 | 11 | 6.1 | B3 |
| Comparative Example 4 | B-4 | WI-7 | 30 | 6.2 | — | — | — | — | — | B1 |
| Comparative Example 5 | B-5 | WI-8 | 31 | 5.0 | — | — | — | — | — | B1 |
| Comparative Example 6 | B-6 | WI-13 | 32 | 4.7 | — | — | — | — | — | B1 |

As shown in Table 3, the white ink (WI-2) of the ink set (B-1) had a surface tension Tw of greater than 30 mN/m and a viscosity Vw of greater than 5.0 mPa·s. The ink set (B-2) had a Tc−Tw value of smaller than 3 mN/m and a Vc−Vw value of smaller than 2.0 mPa·s. The ink set (B-3) had a Tc−Tw value of greater than 10 mN/m and a Vc−Vw value of greater than 6.0 mPa·s. The white ink (WI-7) of the ink set (B-4) had a viscosity Vw of greater than 5.0 mPa·s. The white ink (WI-8) of the ink set (B-5) had a surface tension Tw of greater than 30 mN/m. The white ink (WI-13) of the ink set (B-6) did not contain glycol ether, and had a surface tension Tw of greater than 30 mN/m. As a result, the image formed with any of the ink sets (B-1) to (B-6) on the specific recording medium were rated as any of B1 to B3, which means that unevenness occurred in the formed image.

By contrast, each of the ink sets (A-1) to (A-12) had the following features as shown in Tables 1 to 3. The white ink contained a white pigment, a first polysaccharide, glycol ether, and water. The nonwhite ink contained a nonwhite pigment, a second polysaccharide, and water. The white ink had a surface tension Tw of no greater than 30 mN/m. The Tc−Tw value was at least 3 mN/m and no greater than 10 mN/m. The viscosity Vw of the white ink was no greater than 5.0 mPa·s. The Vc−Vw value was at least 2.0 mPa·s and no greater than 6.0 mPa·s. As a result, the image formed with any of the ink sets (A-1) to (A-12) on the specific recording medium was rated as A, which means that occurrence of unevenness was inhibited in the formed image.

From the above, it can be determined that the ink set according to the present disclosure that encompasses the ink sets (A-1) to (A-12) can inhibit occurrence of unevenness in a formed image in image formation on the specific recording medium. Furthermore, the inkjet recording apparatus and the inkjet recording method according to the present disclosure that use the ink set as above can inhibit occurrence of unevenness in a formed image in image formation on the specific recording medium.

What is claimed is:

1. An inkjet ink set comprising:
   a white ink; and
   a nonwhite ink, wherein
   the white ink contains a white pigment, a first polysaccharide, glycol ether, and water,
   the nonwhite ink contains a nonwhite pigment, a second polysaccharide, and water,
   the white ink has a first surface tension at 25° C. of no greater than 30 mN/m,
   the first surface tension at 25° C. of the white ink and a second surface tension at 25° C. of the nonwhite ink satisfy formula (1),
   the white ink has a first viscosity at 25° C. of no greater than 5.0 mPa·s, and
   the first viscosity at 25° C. of the white ink and a second viscosity at 25° C. of the nonwhite ink satisfy formula (2):

$$3 \text{ mN/m} \leq Tc-Tw \leq 10 \text{ mN/m} \tag{1}$$

$$3.0 \text{ mPa·s} \leq Vc-Vw \leq 6.0 \text{ mPa·s} \tag{2}$$

where in the formula (1), Tw represents the first surface tension at 25° C. of the white ink and Tc represents the second surface tension at 25° C. of the nonwhite ink, and
in the formula (2), Vw represents the first viscosity at 25° C. of the white ink and Vc represents the second viscosity at 25° C. of the nonwhite ink.

2. The inkjet ink set according to claim 1, wherein the glycol ether contained in the white ink is at least one selected from the group consisting of propylene glycol monomethyl ether, propylene glycol monopropyl ether, dipropylene glycol monomethyl ether, dipropylene glycol monopropyl ether, and triethylene glycol monobutyl ether.

3. The inkjet ink set according to claim 1, wherein the first polysaccharide and the second polysaccharide each are a cellulose derivative or a salt thereof.

4. The inkjet ink set according to claim 1, wherein an amount of the first polysaccharide is at least 0.01 parts by mass and no greater than 0.03 parts by mass relative to 100.00 parts by mass of the white ink, and
an amount of the second polysaccharide is at least 0.05 parts by mass and no greater than 0.13 parts by mass relative to 100.00 parts by mass of the nonwhite ink.

5. The inkjet ink set according to claim 1, wherein the white ink further contains a first surfactant, an amount of the first surfactant being at least 0.80 parts by mass and no greater than 1.00 part by mass relative to 100.00 parts by mass of the white ink, and
the nonwhite ink further contains a second surfactant, an amount of the second surfactant being at least 0.30 parts by mass and no greater than 0.65 parts by mass relative to 100.00 parts by mass of the nonwhite ink.

6. The inkjet ink set according to claim 1, wherein the white ink and the nonwhite ink each further contain a water-insoluble resin.

7. An inkjet recording apparatus comprising:
a first recording head that ejects a white ink toward a recording medium; and
a second recording head that ejects a nonwhite ink toward at least a part of an area of the recording medium, the area being an area thereof where the white ink has been ejected, wherein
the white ink contains a white pigment, a first polysaccharide, glycol ether, and water,
the nonwhite ink contains a nonwhite pigment, a second polysaccharide, and water,
the white ink has a first surface tension at 25° C. of no greater than 30 mN/m,
the first surface tension at 25° C. of the white ink and a second surface tension at 25° C. of the nonwhite ink satisfy formula (1),
the white ink has a first viscosity at 25° C. of no greater than 5.0 mPa·s, and
the first viscosity at 25° C. of the white ink and a second viscosity at 25° C. of the nonwhite ink satisfy formula (2):

$$3 \text{ mN/m} \leq Tc - Tw \leq 10 \text{ mN/m} \quad (1)$$

$$3.0 \text{ mPa·s} \leq Vc - Vw \leq 6.0 \text{ mPa·s} \quad (2)$$

where in the formula (1), Tw represents the first surface tension at 25° C. of the white ink and Tc represents the second surface tension at 25° C. of the nonwhite ink, and
in the formula (2), Vw represents the first viscosity at 25° C. of the white ink and Vc represents the second viscosity at 25° C. of the nonwhite ink.

8. An inkjet recording method comprising:
ejecting a white ink toward a recording medium; and
ejecting a nonwhite ink toward at least a part of an area of the recording medium, the area being an area thereof where the white ink has been ejected, wherein
the white ink contains a white pigment, a first polysaccharide, glycol ether, and water,
the nonwhite ink contains a nonwhite pigment, a second polysaccharide, and water,
the white ink has a first surface tension at 25° C. of no greater than 30 mN/m,
the first surface tension at 25° C. of the white ink and a second surface tension at 25° C. of the nonwhite ink satisfy formula (1),
the white ink has a first viscosity at 25° C. of no greater than 5.0 mPa·s, and
the first viscosity at 25° C. of the white ink and a second viscosity at 25° C. of the nonwhite ink satisfy formula (2):

$$3 \text{ mN/m} \leq Tc - Tw \leq 10 \text{ mN/m} \quad (1)$$

$$3.0 \text{ mPa·s} \leq Vc - Vw \leq 6.0 \text{ mPa·s} \quad (2)$$

where in the formula (1), Tw represents the first surface tension at 25° C. of the white ink and Tc represents the second surface tension at 25° C. of the nonwhite ink, and
in the formula (2), Vw represents the first viscosity at 25° C. of the white ink and Vc represents the second viscosity at 25° C. of the nonwhite ink.

* * * * *